United States Patent
Iemura et al.

(10) Patent No.: US 12,030,392 B2
(45) Date of Patent: Jul. 9, 2024

(54) VEHICLE BODY LOWER STRUCTURE

(71) Applicant: HONDA MOTOR CO., LTD., Tokyo (JP)

(72) Inventors: Yu Iemura, Wako (JP); Masaaki Tatsuwaki, Wako (JP); Ken Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 144 days.

(21) Appl. No.: 17/665,618

(22) Filed: Feb. 7, 2022

(65) Prior Publication Data

US 2022/0258620 A1 Aug. 18, 2022

(30) Foreign Application Priority Data

Feb. 15, 2021 (JP) ................................ 2021-021976

(51) Int. Cl.
*B60L 50/60* (2019.01)
*B60K 1/04* (2019.01)
(Continued)

(52) U.S. Cl.
CPC ................ *B60L 50/66* (2019.02); *B60K 1/04* (2013.01); *B60L 50/64* (2019.02); *B62D 21/03* (2013.01); *B60K 2001/0438* (2013.01)

(58) Field of Classification Search
CPC ........... B60L 50/66; B60L 50/64; B60K 1/04; B60K 2001/0438; B62D 21/03
See application file for complete search history.

(56) References Cited

U.S. PATENT DOCUMENTS

2009/0145676 A1  6/2009 Takasaki et al.
2016/0311301 A1  10/2016 Ikeda et al.
(Continued)

FOREIGN PATENT DOCUMENTS

CN  105848943  8/2016
CN  111697172  9/2020
(Continued)

OTHER PUBLICATIONS

Japanese Office Action for Japanese Patent Application No. 2021-021976 dated Oct. 4, 2022.
(Continued)

*Primary Examiner* — James A Shriver, II
*Assistant Examiner* — Nicholas R. Kandas
(74) *Attorney, Agent, or Firm* — Amin, Turocy & Watson, LLP

(57) ABSTRACT

A vehicle body lower structure includes a battery case, a side sill, and a case-mounting frame. The case-mounting frame has a frame main body portion and a battery case reception flange. The battery case reception flange extends to an inward side in a vehicle width direction from the frame main body portion and is joined to a lower surface of a bottom wall of the battery case. A battery support frame extending in a vehicle body forward-rearward direction and supporting a battery is fixed to the bottom wall of the battery case. A recessed portion protruding downward is provided between a joint portion with respect to the battery case reception flange and a joint portion with respect to the battery support frame in the bottom wall of the battery case.

12 Claims, 12 Drawing Sheets

(51) Int. Cl.
    *B60L 50/64*           (2019.01)
    *B62D 21/03*          (2006.01)

(56)                 References Cited

U.S. PATENT DOCUMENTS

| | | |
|---|---|---|
| 2018/0236863 A1 | 8/2018 | Kawabe et al. |
| 2019/0291558 A1* | 9/2019 | Goto |
| 2020/0023905 A1* | 1/2020 | Kawase |
| 2020/0031399 A1* | 1/2020 | Matsuda |
| 2020/0361534 A1* | 11/2020 | Matsuda |

FOREIGN PATENT DOCUMENTS

| | | |
|---|---|---|
| CN | 211629161 | 10/2020 |
| CN | 211731599 | 10/2020 |
| JP | 3132261 | 2/2001 |
| JP | 2007-042345 | 2/2007 |
| JP | 2009-137408 | 6/2009 |
| JP | 2017-196952 | 11/2017 |
| JP | 2018-131136 | 8/2018 |
| JP | 2019-023029 | 2/2019 |

OTHER PUBLICATIONS

Chinese Office Action for Chinese Patent Application No. 202210109840.6 mailed Feb. 1, 2024.

* cited by examiner

VEHICLE BODY LOWER STRUCTURE

CROSS-REFERENCE TO RELATED APPLICATION

This application is based upon and claims the benefit of priority from Japanese Patent Application No. 2021-021976, filed on Feb. 15, 2021, the contents of which are incorporated herein by reference.

BACKGROUND

Field of the Invention

The present invention relates to a vehicle body lower structure in which a battery case accommodating a battery is disposed below a floor panel of a vehicle body.

Background

A vehicle body lower structure in which a battery case internally accommodating a plurality of batteries is disposed below a floor panel of a vehicle and both end portions of the battery case in a vehicle width direction are laid across a pair of side sills below side portions of a vehicle body is known. In vehicles of this kind, it is important that high-voltage batteries inside the battery case can be protected when an impact load is input to the vehicle body from the outside.

As a countermeasure for this, a vehicle body lower structure in which easily-crushed portions (parts which are easily crushed) such as beads are provided at places positioned on outward sides of a battery case in a vehicle width direction in a cross member coupled to side sills has been devised (for example, refer to Japanese Patent No. 3132261).

In this vehicle body lower structure, when an impact load toward an inward side in the vehicle width direction is input to the side sill from a lateral side of the vehicle, the cross member starts to be crushed from the easily-crushed portion as a starting point so that the energy of the impact load is absorbed before the battery case is deformed due to the impact load.

SUMMARY

However, in the foregoing vehicle body lower structure in the related art, after the easily-crushed portion is crushed when an impact load has been input, the crushed part becomes a lump and is displaced in a direction toward the batteries. Therefore, there is concern that a load may be transferred to the batteries from the crushed part and the batteries may be damaged.

An aspect of the present invention provides a vehicle body lower structure in which damage to a mounted battery can be prevented when an impact load is input and the energy of the impact load can be efficiently absorbed.

A vehicle body lower structure according to an aspect of the present invention includes: a battery case that is disposed below a floor panel of a vehicle body and accommodates a battery; a side sill that is disposed below a side portion of the vehicle body in a vehicle body forward-rearward direction; and a case-mounting frame that couples the side sill and the battery case to each other and causes the battery case to be supported by the side sill. The case-mounting frame has a frame main body portion which is disposed on an outward side of the battery case in a vehicle width direction, and a battery case reception flange which extends to an inward side in the vehicle width direction from the frame main body portion and is joined to a lower surface of a bottom wall of the battery case. A battery support frame extending in the vehicle body forward-rearward direction and supporting the battery is joined to an upper surface of the bottom wall of the battery case. A recessed portion protruding downward is provided between a joint portion with respect to the battery case reception flange and a joint portion with respect to the battery support frame in the bottom wall of the battery case.

According to the foregoing constitution, when an impact load toward the inward side in the vehicle width direction is input to the side sill from the outside, the case-mounting frame is displaced to the inward side in the vehicle width direction together with the side sill. At this time, a load from the battery case reception flange of the case-mounting frame toward the recessed portion of the bottom wall of the battery case acts. Accordingly, a deformation fold centering on the recessed portion grows downward at a side edge portion of the bottom wall of the battery case, and the joint portion with respect to the battery case reception flange and the joint portion with respect to the battery support frame in the bottom wall are deformed in accordance with the growth such that they are drawn into the deformation fold and face a downward side (a side away from the battery). As a result, due to the deformation of the side edge portion of the bottom wall of the battery case, the energy of the input impact load is absorbed, and an impact on the battery by the battery case reception flange is curbed.

The recessed portion may have a shape having an outwardly inclined wall which inclines downward toward the inward side in the vehicle width direction from the joint portion side with respect to the battery case reception flange, an inwardly inclined wall which inclines downward toward the outward side in the vehicle width direction from the joint portion side with respect to the battery support frame, and a coupling wall which couples lower ends of the outwardly inclined wall and the inwardly inclined wall to each other in a substantially horizontal manner.

In this case, when an impact load toward the inward side in the vehicle width direction is input to the side sill, a distal end portion of the battery case reception flange interferes with a proximal portion of the outwardly inclined wall of the recessed portion so that the recessed portion forms a deformation fold from the proximal portion of the outwardly inclined wall as a starting point. At this time, the recessed portion is easily deformed at each of end portions of the outwardly inclined wall, the coupling wall, and the inwardly inclined wall as bent points so that the deformation fold grows to the downward side. As a result, the distal end portion of the battery case reception flange reliably faces the downward side, and thus an impact on the battery by the battery case reception flange can be reliably avoided.

The recessed portion may extend in a groove shape in the vehicle body forward-rearward direction in the bottom wall of the battery case.

In this case, when an impact load toward the inward side in the vehicle width direction is input to the side sill, a deformation fold is formed in a wide region at the side edge portion of the bottom wall of the battery case such that the distal end side of the battery case reception flange faces downward. Therefore, when this constitution is employed, an impact on the battery by the battery case reception flange can be more reliably avoided.

A plurality of batteries each having a rectangular parallelepiped shape may be disposed side by side in a vehicle forward-rearward direction and the vehicle width direction in the battery case while having a longitudinal direction thereof extending in the vehicle forward-rearward direction.

In this case, a plurality of batteries are disposed side by side in the vehicle forward-rearward direction and the vehicle width direction such that the longitudinal direction thereof extends in the vehicle forward-rearward direction. Therefore, a deformation space for the side edge portion of the battery case can be easily secured by adjusting the number of arrays of the batteries in the vehicle width direction without causing drastic reduction of battery capacities of the batteries. Therefore, when this constitution is employed, reduction of the battery capacities of the batteries can be curbed and an increase in the amount of energy absorption when an impact load is input can be achieved.

The case-mounting frame may include the frame main body portion which has a substantially L-shaped cross section having a horizontal portion joined to a lower surface of the side sill and an upright standing portion standing upright from the inward side of the horizontal portion in the vehicle width direction, and the battery case reception flange which extends to the inward side in the vehicle width direction from a lower end of the frame main body portion. A plurality of hollow cells partitioned by a partition wall may be provided in the frame main body portion.

In this case, the frame main body portion of the case-mounting frame has a substantially L-shaped cross section, and the horizontal portion thereof is joined to the lower surface of the side sill. Accordingly, the case-mounting frame is fixed to a lower portion side of the side sill with high rigidity. In addition, the frame main body portion includes the plurality of hollow cells. Therefore, the rigidity of the frame main body portion itself is enhanced by the plurality of hollow cells. Moreover, when an impact load is input to the side sill, the plurality of hollow cells of the frame main body portion are crushed so that the energy of the impact load can be efficiently absorbed during a sufficient stroke.

A floor cross member extending substantially in the vehicle width direction may be joined to an upper surface of the floor panel positioned above the battery case. In the floor cross member, a height of an end edge on the outward side in the vehicle width direction may gradually decrease toward a terminal portion, and the terminal portion may be joined to an upper surface of the side sill. An inclined member obliquely coupling a lower surface of the floor panel to an inward side surface of the side sill facing the inward side in the vehicle width direction may be disposed at a position below the end edge of the floor cross member on the lower surface of the floor panel.

In this case, when an occupant load is input onto an upper portion of the side edge of the floor cross member via a seat or the like, the load is transferred to the side sill via the side edge of the floor cross member and the inclined member. For this reason, in spite of having a shape in which the height of the side edge portion of the floor cross member gradually decreases toward the outward side in the vehicle width direction, an occupant load input to the floor cross member can be supported with high rigidity. In addition, when an impact load is input to the side sill from a lateral side, the inward side surface of the side sill can be supported by a closed cross-sectional structure portion of the floor cross member and the floor panel via the inclined member. For this reason, the side sill can be sufficiently crushed and deformed at a part on the outward side of the battery case in the vehicle width direction so that the energy of an impact load can be efficiently absorbed. Therefore, when this constitution is employed, damage to the battery inside the battery case can be better curbed.

The case-mounting frame may be an extruded aluminum member.

In this case, the battery case-mounting frame can be easily formed by cutting a piece of long material which has been shaped through aluminum extrusion and has a substantially uniform cross section into a suitable length. In addition, the battery case-mounting frames having a common cross section can be used in many vehicles which differ in size of the battery case by changing a cutting length of the long material having a substantially uniform cross section. For this reason, productivity of the battery case-mounting frame can be enhanced.

At least the bottom wall of the battery case and a peripheral wall surrounding the bottom wall may be constituted of an integrally pressed article.

In this case, an outer shell portion of the battery case and the groove-shaped recessed portion can be easily formed through press forming.

The battery may be constituted of a plurality of battery cells stacked in a longitudinal direction. A plurality of batteries each having a rectangular parallelepiped shape may be disposed side by side in the vehicle width direction in the battery case while having a longitudinal direction thereof extending in a vehicle forward-rearward direction. A battery accessory may be disposed in an upper portion at a center in the vehicle width direction of the plurality of batteries arranged in the vehicle width direction.

In this case, the batteries having a rectangular parallelepiped shape of which the longitudinal direction extends in the vehicle forward-rearward direction are disposed side by side in the vehicle width direction, and the battery accessory is disposed in the upper portion of the batteries at the center in the vehicle width direction. Therefore, the dimensions of the batteries in their entirety in the vehicle width direction can be shortened without reducing the battery capacities of the batteries in their entirety. Therefore, a larger space for absorbing the energy of an impact load can be secured on the outward side of the batteries in the vehicle width direction by an amount corresponding to the dimensions of the batteries in their entirety in the vehicle width direction which can be reduced.

A plurality of batteries each having a rectangular parallelepiped shape may be disposed side by side in a vehicle forward-rearward direction and the vehicle width direction in the battery case while having a longitudinal direction thereof extending in the vehicle forward-rearward direction. An electric wiring connected to the battery may be disposed at a boundary portion between the front and rear batteries which are arranged in the vehicle forward-rearward direction. A plurality of floor cross members extending in the vehicle width direction may be joined to an upper surface of the floor panel. At least one of the floor cross members may be disposed at each of front and rear positions in the vehicle with the boundary portion sandwiched therebetween.

In this case, the electric wiring connected to the battery is disposed at the boundary portion between the front and rear batteries, and the floor cross members are disposed on sides in front and behind the boundary portion where the electric wiring is disposed in the vehicle. For this reason, when an impact load is input from a lateral side of the vehicle, the electric wiring can be protected by the front and rear floor cross members. Therefore, when this constitution is employed, damage to the electric wiring can be curbed, and a larger space for absorbing the energy of an impact load can be secured on the outward side of the battery in the vehicle width direction.

In the vehicle body lower structure according to an aspect of the present invention, the recessed portion protruding downward is provided between the joint portion with respect to the battery case reception flange and the joint portion with respect to the battery support frame in the bottom wall of the battery case. For this reason, when an impact load toward the inward side in the vehicle width direction is input to the side sill, a deformation fold centering on the recessed portion grows to the downward side at the side edge portion of the bottom wall of the battery case. At this time, the energy of an impact load is absorbed, and the distal end portion side of the battery case reception flange faces the downward side of the battery. Therefore, when the vehicle body lower structure according to the present invention is employed, damage to the battery by the battery case reception flange can be prevented when an impact load is input, and the energy of the impact load can be efficiently absorbed.

DESCRIPTION OF EMBODIMENTS

Figure 1:
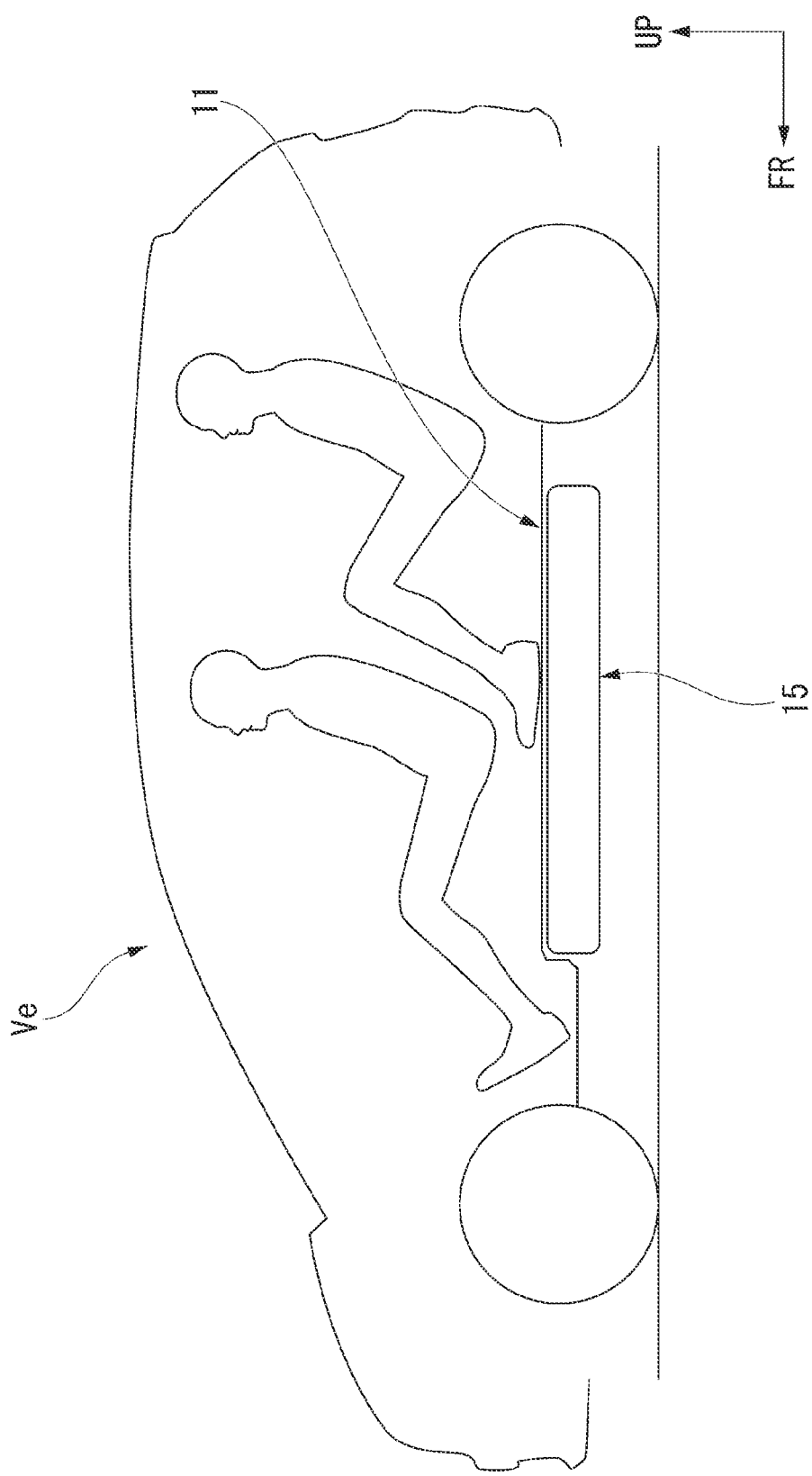
FIG. 1 is a schematic view of a vehicle of an embodiment viewed from a left side.

Hereinafter, an embodiment of the present invention will be described on the basis of the drawings. In the drawings, the arrow FR indicates a front side of a vehicle Ve, the arrow UP indicates an upward side of the vehicle Ve, and the arrow LH indicates a left side of the vehicle Ve. In addition, the vehicle Ve substantially has a bilaterally symmetrical constitution. For this reason, hereinafter, regarding bilaterally symmetrical parts, only one of the left and right parts will be described, and description of the other part will be omitted.

Figure 2:
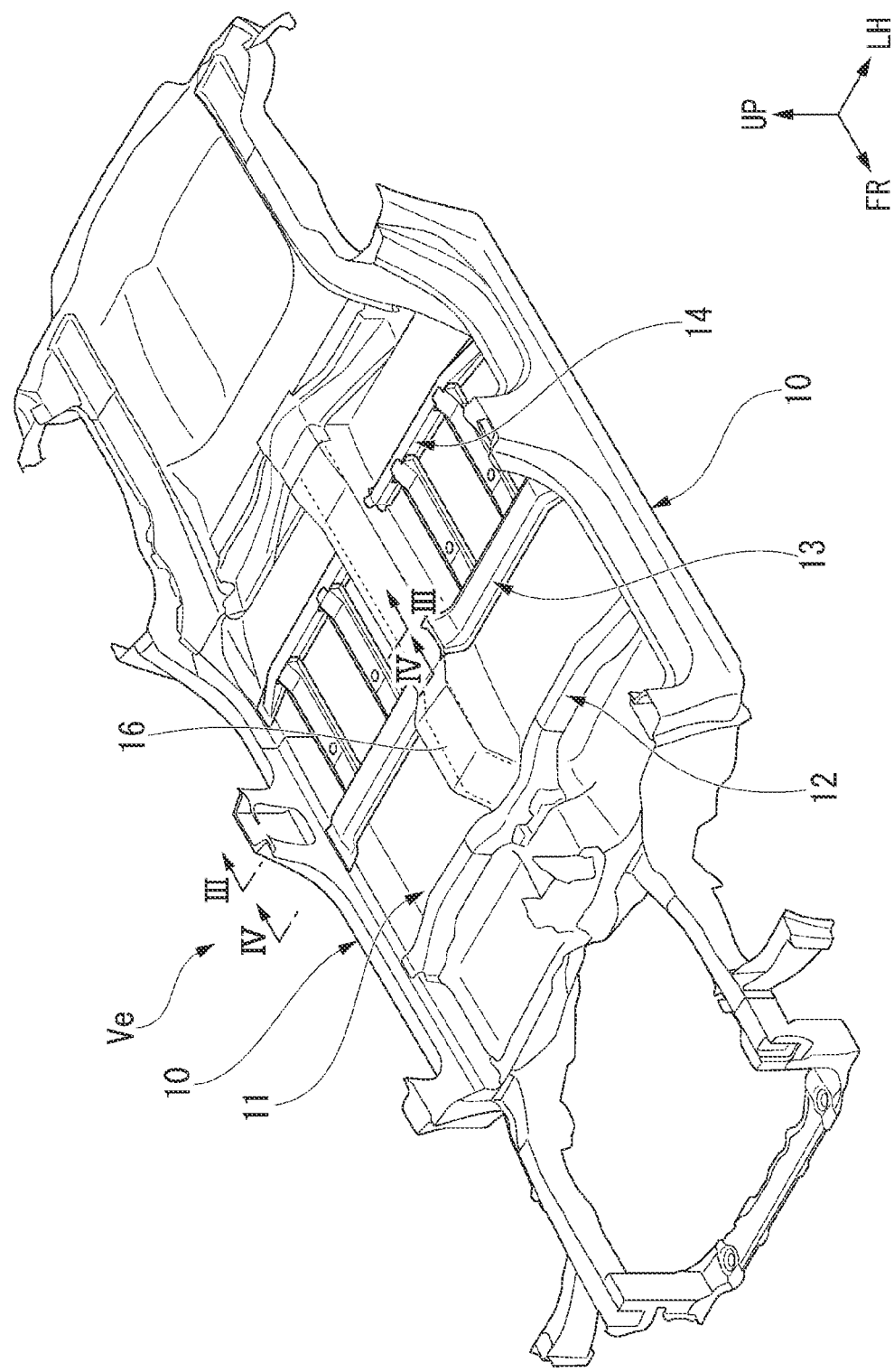
FIG. 2 is a perspective view of a skeleton portion in a lower portion of the vehicle of the embodiment viewed obliquely from a side in front.
Figure 3:
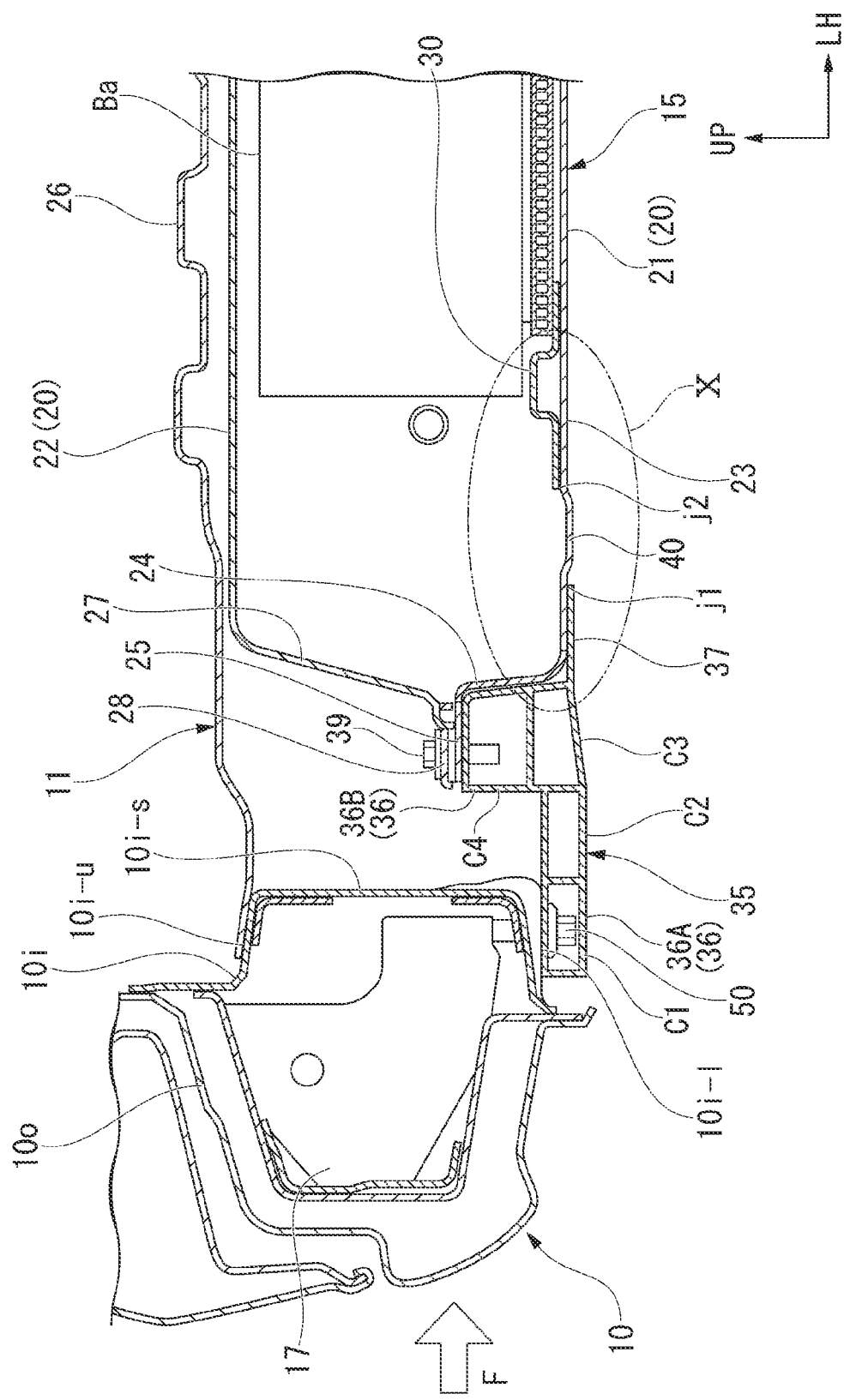
FIG. 3 is a cross-sectional view along line in FIG. 2.
Figure 4:
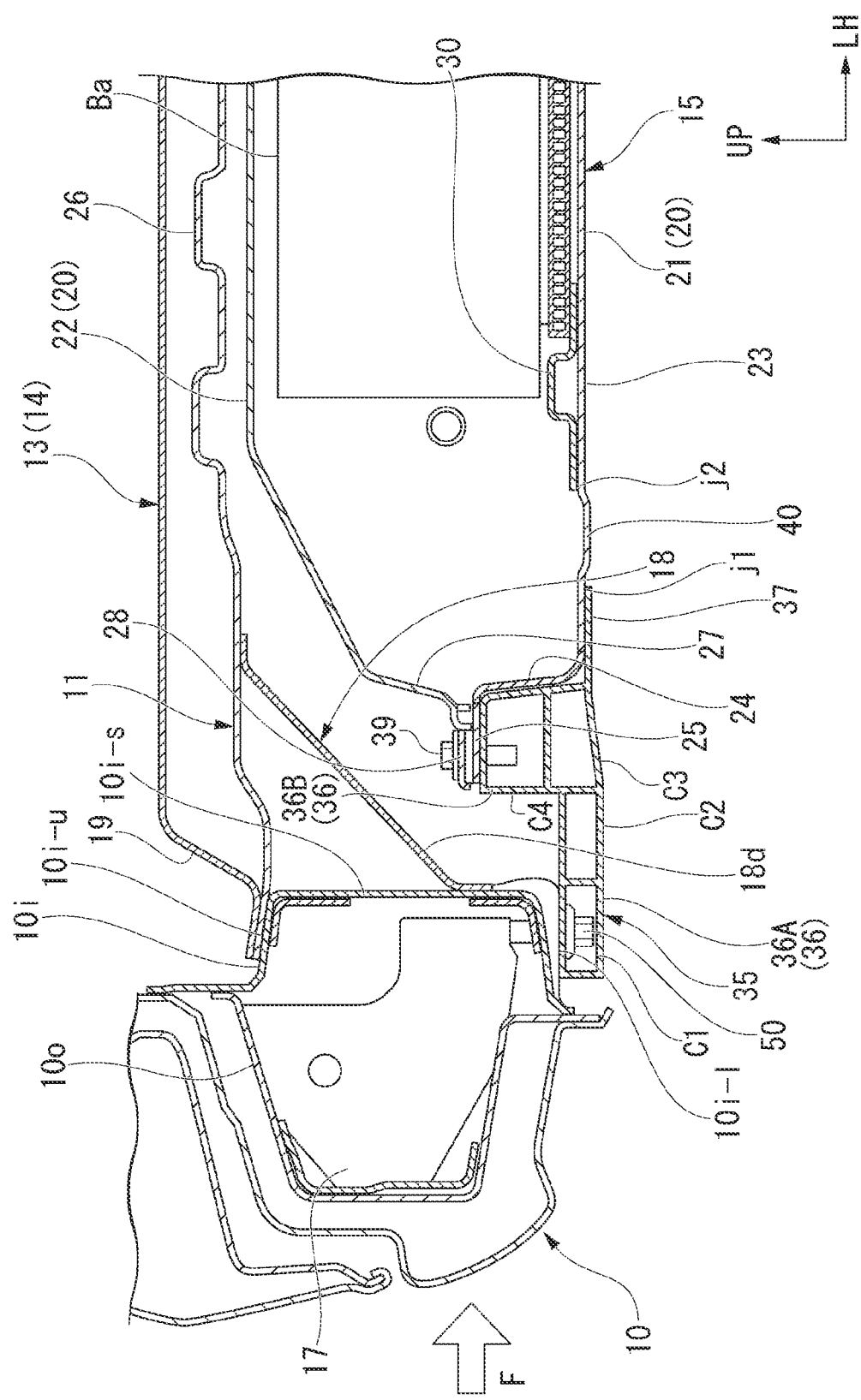
FIG. 4 is a cross-sectional view along line IV-IV in FIG. 2.

FIG. 1 is a schematic view of the vehicle Ve of the present embodiment viewed from the left side. FIG. 2 is a perspective view of a skeleton portion in a lower portion of the vehicle Ve viewed obliquely from a side in front. FIG. 3 is a cross-sectional view along line in the vehicle Ve of FIG. 2, and FIG. 4 is a cross-sectional view along line IV-IV in the vehicle Ve of FIG. 2.

The vehicle Ve of the present embodiment is an electrically driven vehicle in which batteries Ba serving as drive power sources (refer to FIGS. 3 and 4) are mounted below an occupant compartment. The vehicle Ve includes a pair of left and right side sills 10 which are disposed in lower end side portions of a vehicle body, a floor panel 11 of which both end portions in a vehicle width direction are laid across upper portions of the left and right side sills 10, a plurality of floor cross members 12, 13, and 14 which are joined to an upper surface of the floor panel 11, and a battery pack 15 which is laid across lower portions of the left and right side sills 10 on a downward side of the floor panel 11. A plurality of batteries Ba are built into the battery pack 15.

The side sills 10 extend in a vehicle forward-rearward direction below side portions of a vehicle compartment. All the floor cross members 12, 13, and 14 substantially extend in the vehicle width direction. Lower surfaces thereof are joined to the upper surface of the floor panel 11, and both end portions thereof in an extending direction are bonded to the upper portions of the left and right side sills 10. The floor cross members 12, 13, and 14 are disposed so as to be separated from each other in a vehicle body forward-rearward direction. In addition, as illustrated in FIG. 2, a floor tunnel 16 protruding toward the upward side of the vehicle is provided substantially at the center of the floor panel 11 in the vehicle width direction. The floor tunnel 16 extends in the vehicle forward-rearward direction. Each of the floor cross members 12, 13, and 14 extends toward outward sides in the vehicle width direction from both left and right sides of the floor tunnel 16.

The floor cross member 12 disposed on the foremost side in the vehicle is disposed on the upper surface of the floor panel 11 on a side in front of a mounting position of the battery pack 15 in the vehicle. The two remaining floor cross members 13 and 14 on a side behind the floor cross member 12 are disposed on the upper surface of the floor panel 11 above the mounting position of the battery pack 15. A cross section of each of the floor cross members 12, 13, and 14 orthogonal to the vehicle width direction is formed to substantially have a hat shape in which joint flanges project forward and rearward. In each of the floor cross members 12, 13, and 14, the front and rear joint flanges are joined to the upper surface of the floor panel 11 so that each of the floor cross members 12, 13, and 14 forms a closed cross section extending in the vehicle width direction together with the floor panel 11.

As illustrated in FIGS. 3 and 4, in each of the side sills 10, an outer side sill 10o and an inner side sill 10i each having a substantially hat-shaped cross section with upper and lower joint flanges are vertically joined to each other and form a closed cross section. The closed cross section extends in the vehicle forward-rearward direction along the side portions of the vehicle Ve.

A bulkhead 17 for reinforcing the closed cross section formed by the outer side sill 10o and the inner side sill 10i is attached to a suitable place inside the side sill 10.

An end portion of the floor panel 11 on the outward side in the vehicle width direction overlaps an upper wall 10i-u of the inner side sill 10i and is joined to the upper wall 10i-u in this state. In addition, each of the end portions of the floor cross members 12, 13, and 14 on the outward side in the vehicle width direction overlaps the upper surface of the end portion of the floor panel 11 on the outward side in the vehicle width direction and is joined to the floor panel 11 and the upper wall 10*i-u* of the inner side sill 10*i* in this state.

However, as illustrated in FIG. 4, in the two rear floor cross members 13 and 14, a height of an end edge on the outward side in the vehicle width direction gradually decreases toward a terminal portion. Namely, an inclined surface 19 inclining downward toward the terminal portion is provided at the upper portion of the end edge on the outward side in the vehicle width direction in each of the floor cross members 13 and 14. In the floor cross members 13 and 14, the terminal portion at which the height becomes the smallest is joined to the upper wall 10*i-u* of the side sill 10 together with the floor panel 11.

In addition, an inclined member 18 is disposed below an edge portion on the outward side in the vehicle width direction in each of the floor cross members 13 and 14 with the floor panel 11 sandwiched therebetween. The inclined member 18 is joined to a lower surface of the floor panel 11 and an inward side surface of a side wall 10i-s of the inner side sill 10*i* in the vehicle width direction (an inward side surface of the side sill 10 facing an inward side in the vehicle width direction).

Figure 5:
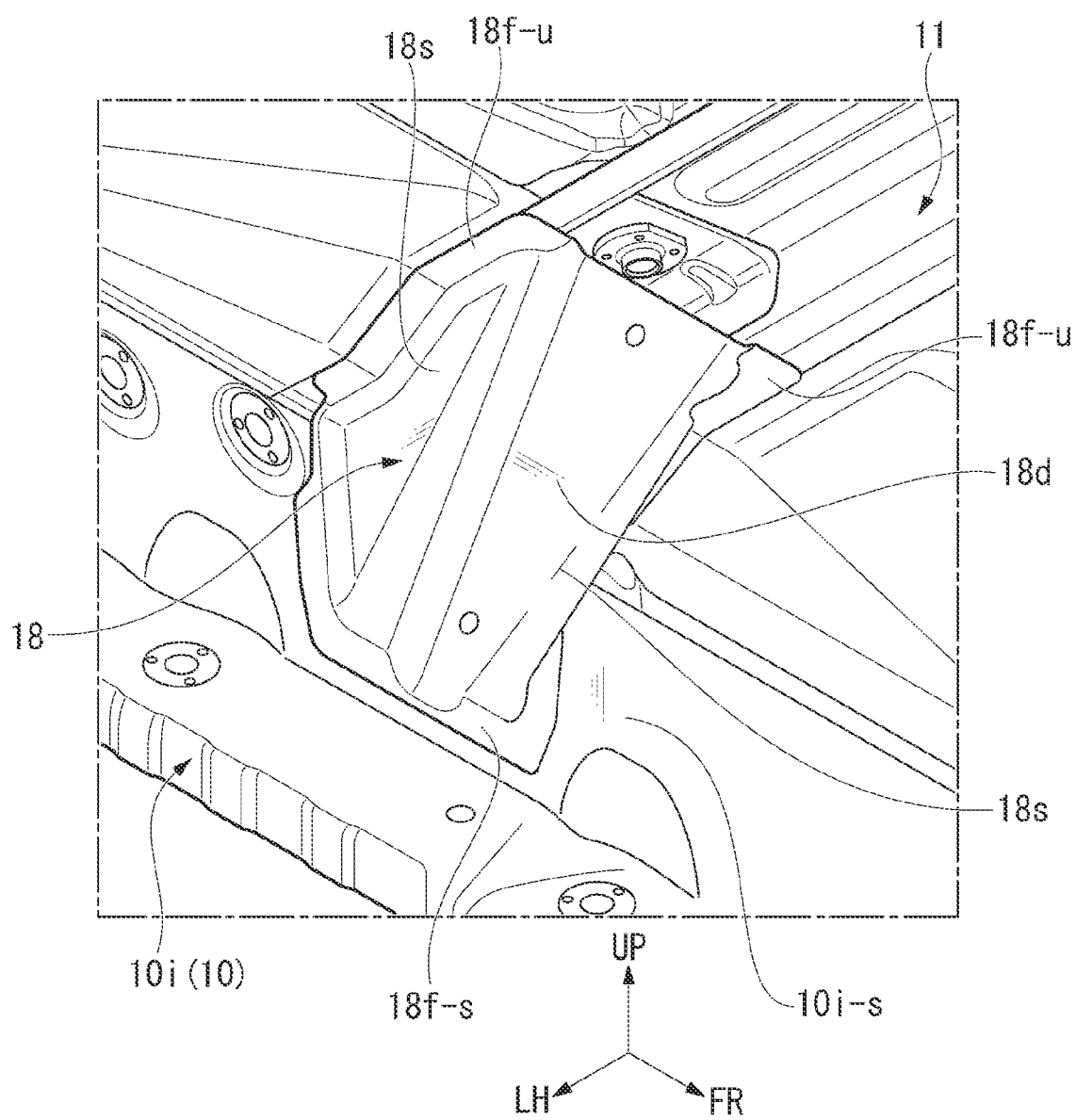
FIG. 5 is a perspective view of a joint portion of an inclined member of the embodiment viewed from a downward side of the vehicle.

FIG. 5 is a perspective view of a joint portion of the inclined member 18 viewed from the downward side of the vehicle.

As illustrated in FIG. 5, the inclined member 18 includes a pair of side walls 18s which face the front and the rear of the vehicle, and an inclined wall 18*d* which connects oblique sides of the pair of side walls 18s to each other. An upper flange 18f-u which is joined to the lower surface of the floor panel 11 and a side flange 18f-s which is joined to the inward side surface of the inner side sill 10*i* (the inward side surface of the side wall 10*i-s* in the vehicle width direction) are formed in each of the side walls 18s. The side flange 18*f-s* is continuously formed across the pair of side walls 18s and the inclined wall 18*d*. Since the upper flange 18*f-u* is joined to the lower surface of the floor panel 11 and the side flange 18*f-s* is joined to the inward side surface of the inner side sill 10*i*, a closed cross section extending in the vehicle width direction is formed between the inclined member 18 and the floor panel 11. In this state, the inclined wall 18*d* becomes substantially parallel to the inclined surface 19 at the edge portion on the outward side in the vehicle width direction in each of the floor cross members 13 and 14. An area of the closed cross section formed by the inclined member 18 and the floor panel 11 gradually increases toward the outward side in the vehicle width direction as an area of the closed cross section formed by a side edge of each of the floor cross members 13 and 14 and the floor panel 11 gradually decreases toward the outward side in the vehicle width direction. Therefore, a composite cross section of a cross section of the side edge of each of the floor cross members 13 and 14 and a cross section of the inclined member 18 extends toward the inward side surface of the side sill 10 from a central region in each of the floor cross members 13 and 14 while having an approximately uniform cross section.

Figure 6:
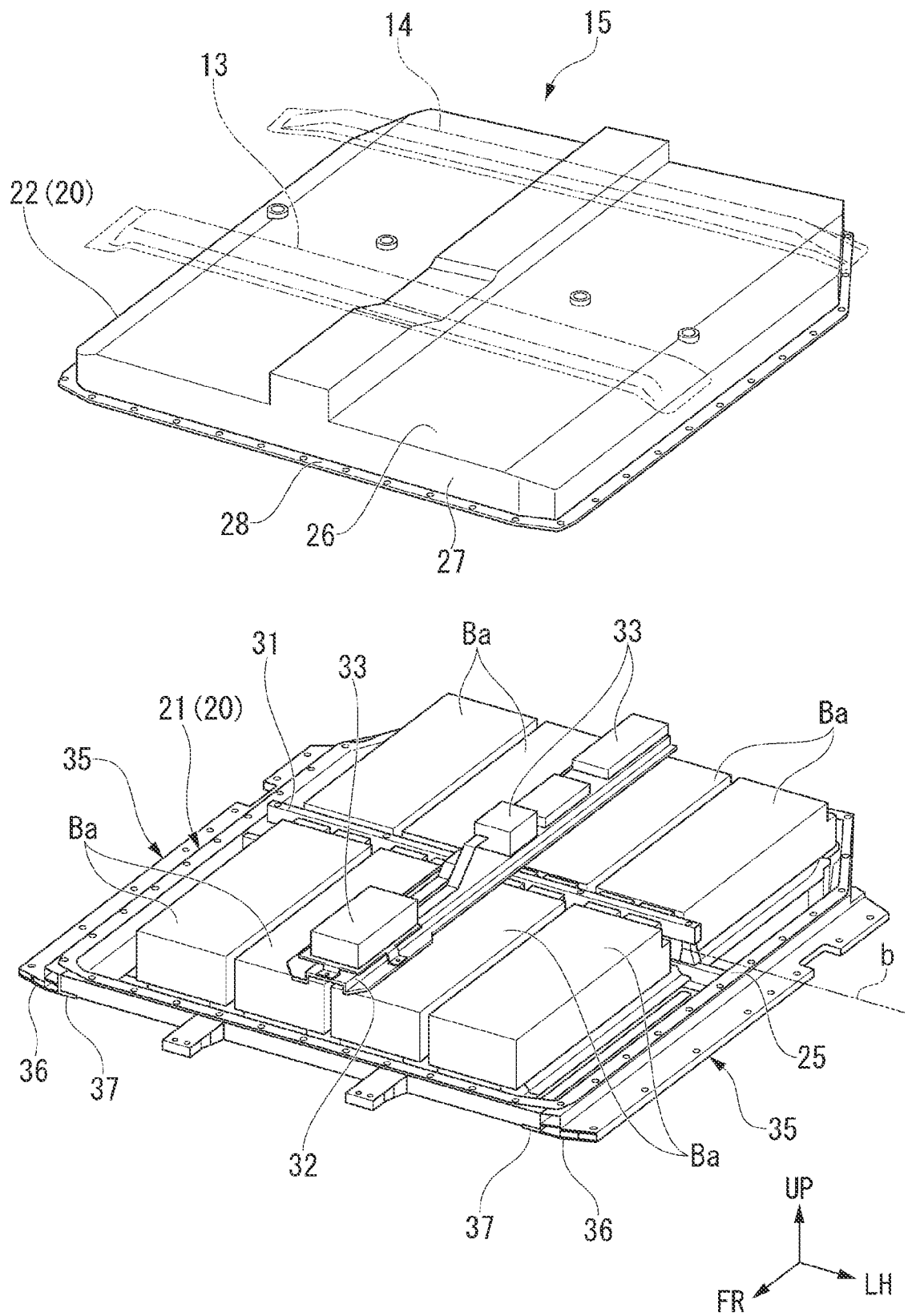
FIG. 6 is an exploded perspective view of a battery pack of the embodiment.

FIG. 6 is an exploded perspective view of the battery pack 15.

The battery pack 15 includes a plurality of batteries Ba, a battery case 20 in which the plurality of batteries Ba are fixed and installed, and a pair of case-mounting frames 35 which are attached to the left and right side portions of the battery case 20 and cause the battery case 20 to be supported by the left and right side sills 10 in the vehicle body.

Figure 7:
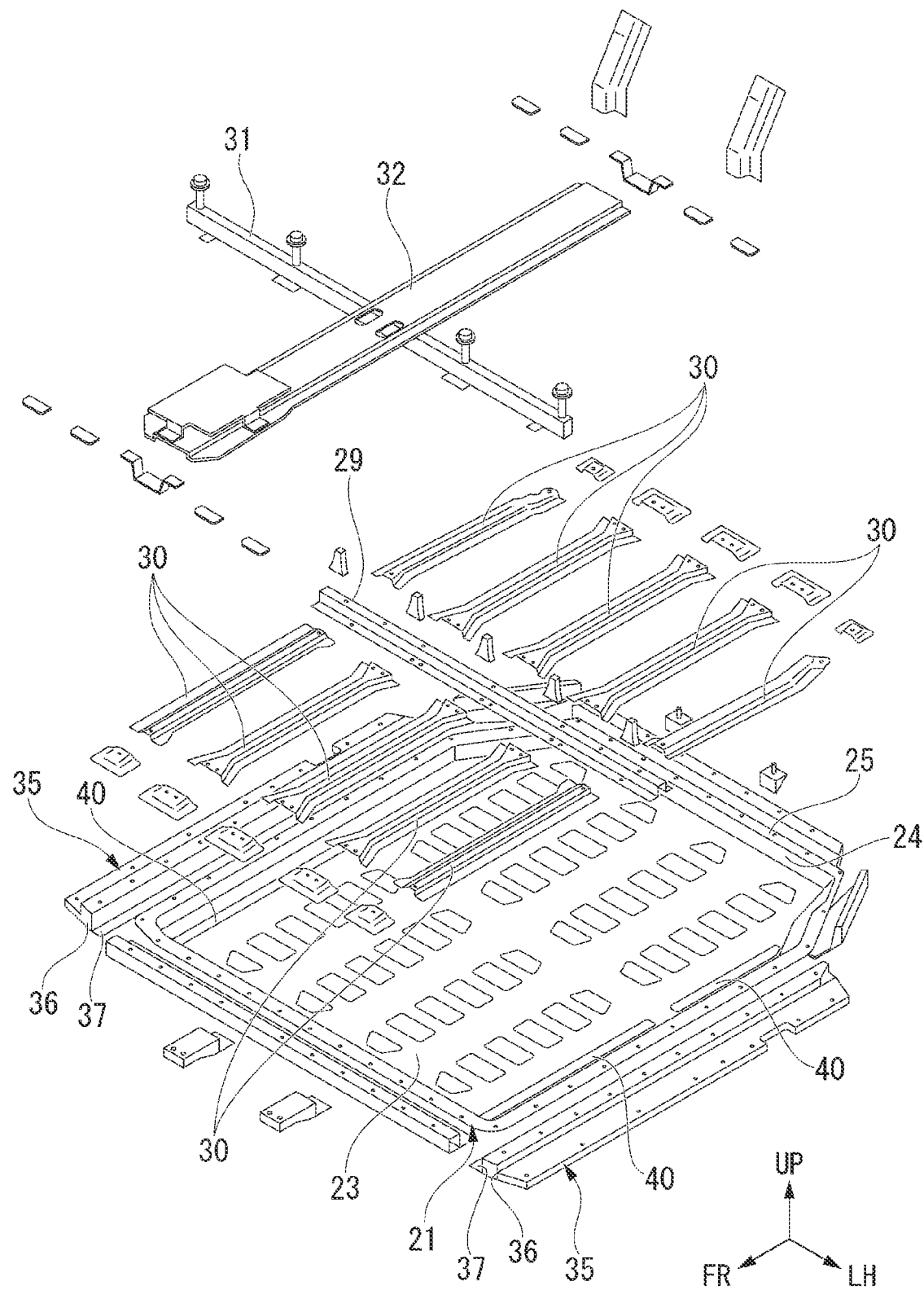
FIG. 7 is an exploded perspective view illustrating a part of a battery case of the embodiment and components to be attached to the battery case.

FIG. 7 is an exploded perspective view illustrating a part of the battery case 20 and components to be attached to the battery case 20.

As illustrated in FIG. 6, the battery case 20 includes a case main body 21 of which the upward side opens in a substantially rectangular shape in plan view, and a case cover 22 of which the downward side opens in a substantially rectangular shape similarly in plan view. In the battery case 20, an opening edge at an upper portion of the case main body 21 overlaps an opening edge of the case cover 22 and both are bonded to each other in this state, thereby forming a box-shaped internal space.

Figure 8:
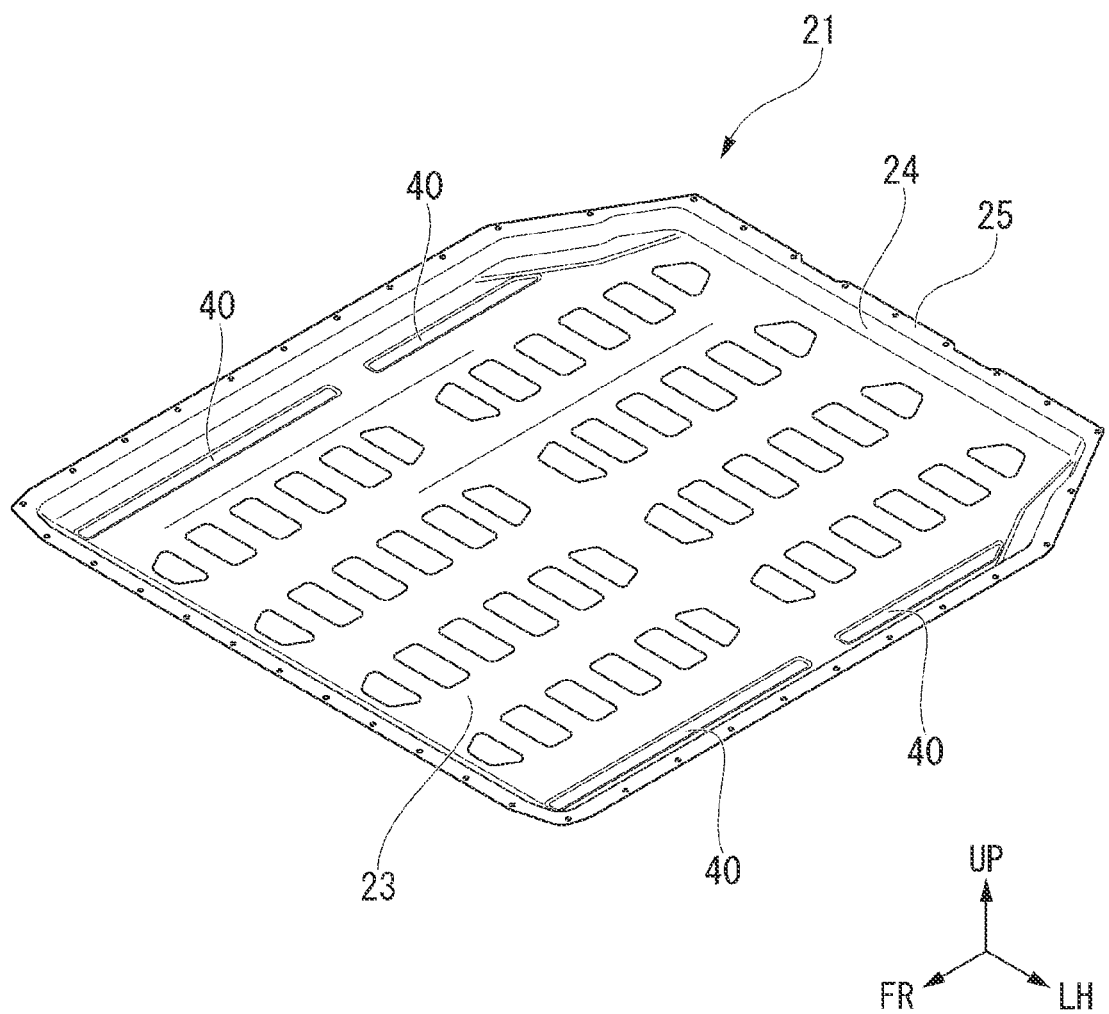
FIG. 8 is a perspective view of a case main body of the battery case of the embodiment.

FIG. 8 is a perspective view of the case main body 21.

The case main body 21 has a bottom wall 23 which has a substantially rectangular shape in plan view, a side wall 24 which rises upward from a peripheral area of the bottom wall 23, and a joint flange 25 which projects to the outward side from an upper end portion of the side wall 24. The case main body 21 is constituted of a metal plate and is integrally formed through press forming. As illustrated in FIG. 6, the case cover 22 has an upper wall 26 which has a substantially rectangular shape in plan view, a side wall 27 which extends downward from a peripheral area portion of the upper wall 26, and a joint flange 28 which projects to the outward side from a lower end of the side wall 27. The case main body 21 and the case cover 22 are bonded to each other through bolt fastening between the joint flanges 25 and 28.

As illustrated in FIG. 7, a lower cross member 29 extending in the vehicle width direction is attached to an upper surface of the bottom wall 23 of the case main body 21. The lower cross member 29 has a substantially hat-shaped cross section which continues in the vehicle width direction. The lower cross member 29 is disposed substantially at a center position in the bottom wall 23 of the case main body 21 in the vehicle forward-rearward direction. In addition, a plurality of battery support frames 30 for supporting lower ends of the batteries Ba are attached to a front side region and a rear side region of the lower cross member 29 on the upper surface of the bottom wall 23 of the case main body 21. Each of the battery support frames 30 extends in the vehicle forward-rearward direction. In addition, the battery support frames 30 adjacent to each other in the vehicle width direction are separated with a uniform gap therebetween.

The batteries Ba are fixed and installed at upper portions of the battery support frames 30 installed on the bottom wall 23. The batteries Ba are formed to have a rectangular parallelepiped shape of which one direction becomes a longitudinal direction. The batteries Ba are constituted of a plurality of battery cells (not illustrated) stacked in the longitudinal direction. On the case main body 21, the plurality of batteries Ba are disposed side by side in two stages in the vehicle forward-rearward direction and four rows in the vehicle width direction while having the longitudinal direction thereof extending in the vehicle forward-rearward direction. Specifically, four batteries Ba are disposed in four rows in the vehicle width direction in the front side region of the lower cross member 29, and the remaining four batteries Ba are similarly disposed in four rows in the vehicle width direction in the rear side region of the lower cross member 29. Each of the batteries Ba is attached to the corresponding battery support frame 30 by appropriate means such as bolt fastening.

In the present embodiment, the batteries Ba are disposed in two stages in the front and the rear and four rows in the width direction, but the number and the array of batteries Ba are not limited thereto.

Electric wirings (not illustrated) connected to the respective batteries Ba are disposed at a boundary portion b (refer to FIG. 6) between the batteries Ba in the four front rows and the batteries Ba in the four rear rows disposed on the case main body 21 as described above. An upper cross member 31 is fixed to an upper portion of the lower cross member 29 through bolt fastening or the like. The upper cross member 31 extends in the vehicle width direction parallel to the lower cross member 29, presses the batteries Ba in the four front rows and the batteries Ba in the four rear rows from above, and protects the electric wirings disposed at the boundary portion b from the surroundings.

In addition, a support plate 32 elongated in the forward-rearward direction is fixed to an upper portion at the center in the vehicle width direction of a group of the batteries Ba disposed in the four front rows and the four rear rows as described above. Battery accessories 33 such as a high-voltage junction box and an electronic control unit (ECU) are attached to the support plate 32.

The two rear floor cross members 13 and 14 joined to the upper surface of the floor panel 11 are respectively disposed at positions which become front and rear positions in the vehicle sandwiching the boundary portion b between the front and rear batteries Ba when the battery pack 15 is mounted below the floor panel 11.

As illustrated in FIGS. 3 and 4, case-mounting frames 35 are fixed to the left and right side portions of the case main body 21. The case-mounting frames 35 couple the side sills 10 and the battery case 20 to each other and cause the battery case 20 to be supported by the side sills 10. The case-mounting frames 35 extend forward and rearward in the vehicle with approximately the same lengths as the left and right side portions of the case main body 21. In the present embodiment, the case-mounting frames 35 are constituted of extruded aluminum members.

Figure 9:
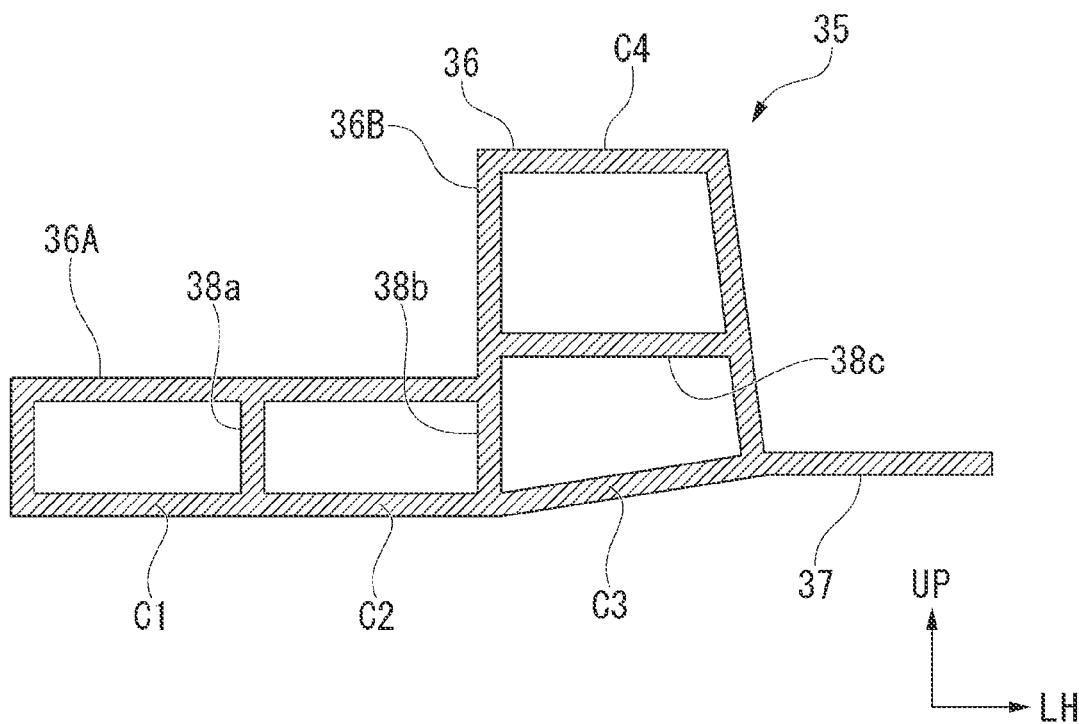
FIG. 9 is a cross-sectional view of a case-mounting frame of the embodiment cut in a direction orthogonal to a vehicle body forward-rearward direction.

FIG. 9 is a cross-sectional view of the case-mounting frame 35 cut in a direction orthogonal to the vehicle body forward-rearward direction.

As illustrated in FIGS. 3, 4, and 9, the case-mounting frames 35 each have a frame main body portion 36 which is disposed on the outward side of the battery case 20 in the vehicle width direction, and a battery case reception flange 37 which extends to the inward side in the vehicle width direction from a lower end of the frame main body portion 36 and supports the bottom wall 23 of the battery case 20. The frame main body portion 36 is formed to have a substantially L-shaped cross-sectional shape having a horizontal portion 36A of which an upper surface on one end side is joined to a lower surface 10i-1 of the inner side sill 10i (the side sill 10), and an upright standing portion 36B which stands upright from a region of the horizontal portion 36A on the outward side in the vehicle width direction. This substantially L-shaped cross section extends in the vehicle forward-rearward direction. The frame main body portion 36 has a hollow structure of which the inside is partitioned by a plurality of partition walls 38a, 38b, and 38c. Since the inside of the frame main body portion 36 of the present embodiment is partitioned by the partition walls 38a, 38b, and 38c, the frame main body portion 36 has a structure having a plurality of hollow cells C1, C2, C3, and C4. In the frame main body portion 36, three hollow cells C1, C2, and C3 are linearly arranged in the vehicle width direction, and the remaining hollow cell C4 is disposed at an upper portion of the hollow cell C3 on the inward side in the vehicle width direction.

As illustrated in FIGS. 3 and 4, the joint flange 25 of the case main body 21 and the joint flange 28 of the case cover 22 overlap each other on an upper surface of the upright standing portion 36B of the frame main body portion 36, and both the joint flanges 25 and 28 are fastened and fixed to each other in this state using a bolt 39. At this time, the batteries Ba, the battery accessories 33, and the like are attached inside the case main body 21 in advance.

In addition, the battery case reception flange 37 extending to the inward side in the vehicle width direction from the frame main body portion 36 overlaps a lower surface of a side edge portion of the bottom wall 23 of the battery case 20 on the outward side in the vehicle width direction and is joined to the bottom wall 23 in this state. The case-mounting frame 35 is fixed to the battery case 20 by joining the battery case reception flange 37 to the bottom wall 23 and bolt-fastening the upper surface of the upright standing portion 36B to the joint flange 25. The battery pack 15 is constituted by fixing the case-mounting frame 35 to the battery case 20 in which the batteries Ba are fixed and installed.

In the battery pack 15 constituted as described above, as illustrated in FIGS. 3 and 4, upper surfaces of the horizontal portions 36A of the left and right case-mounting frames 35 overlap the lower surfaces 10i-1 of the inner side sills 10i, and the battery pack 15 is attached to the inner side sills 10i (side sills 10) in this state using bolts 50.

Here, as illustrated in FIGS. 3 and 4, a recessed portion 40 protruding downward is provided between a joint portion j1 with respect to the battery case reception flange 37 and a joint portion j2 with respect to the battery support frame 30 on the outermost side in the vehicle width direction in the bottom wall 23 of the battery case 20.

Figure 10:
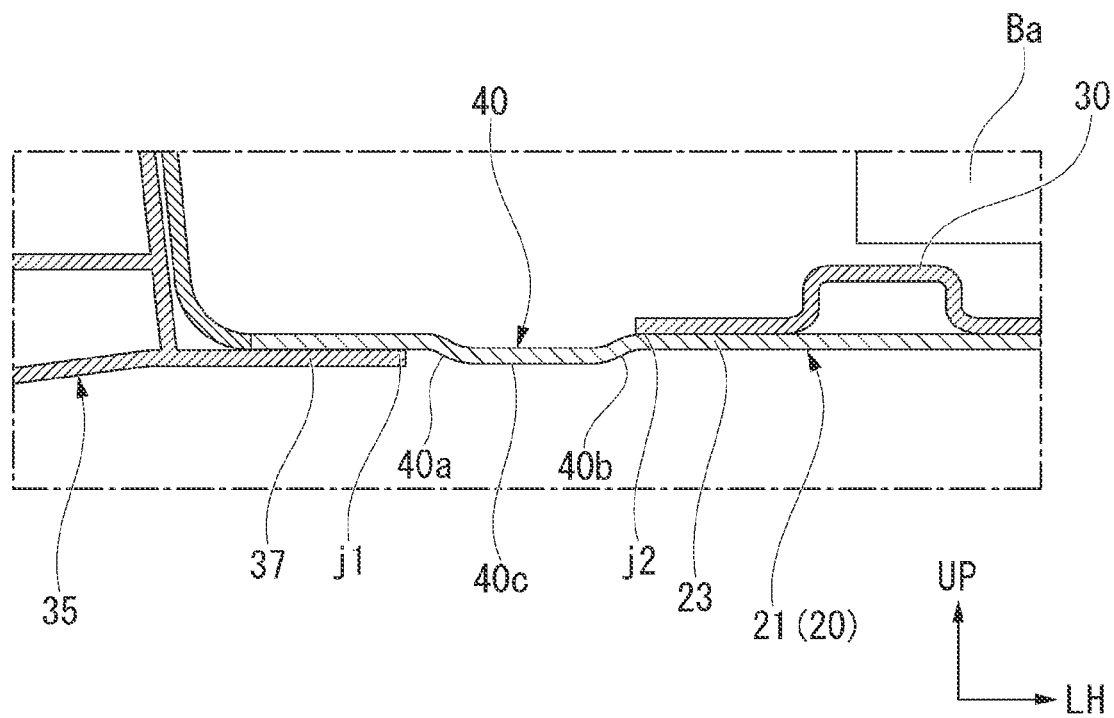
FIG. 10 is an enlarged view of the part X in FIG. 3.

FIG. 10 is an enlarged view of the part X in FIG. 3.

As illustrated in FIG. 10, the recessed portion 40 has an outwardly inclined wall 40a which inclines downward toward the inward side in the vehicle width direction from the joint portion j1 side with respect to the battery case reception flange 37, an inwardly inclined wall 40b which inclines downward toward the outward side in the vehicle width direction from the joint portion j2 side with respect to the battery support frame 30, and a coupling wall 40c which couples the lower ends of the outwardly inclined wall 40a and the inwardly inclined wall 40b to each other in a substantially horizontal manner.

As illustrated in FIG. 8, the recessed portion 40 extends in a groove shape in the vehicle forward-rearward direction at the left and right side edge portions of the bottom wall 23 of the battery case 20. The groove-shaped recessed portion 40 is simultaneously formed when the case main body 21 is subjected to press forming. The case main body 21 of the present embodiment is constituted of a pressed article.

Figure 11:
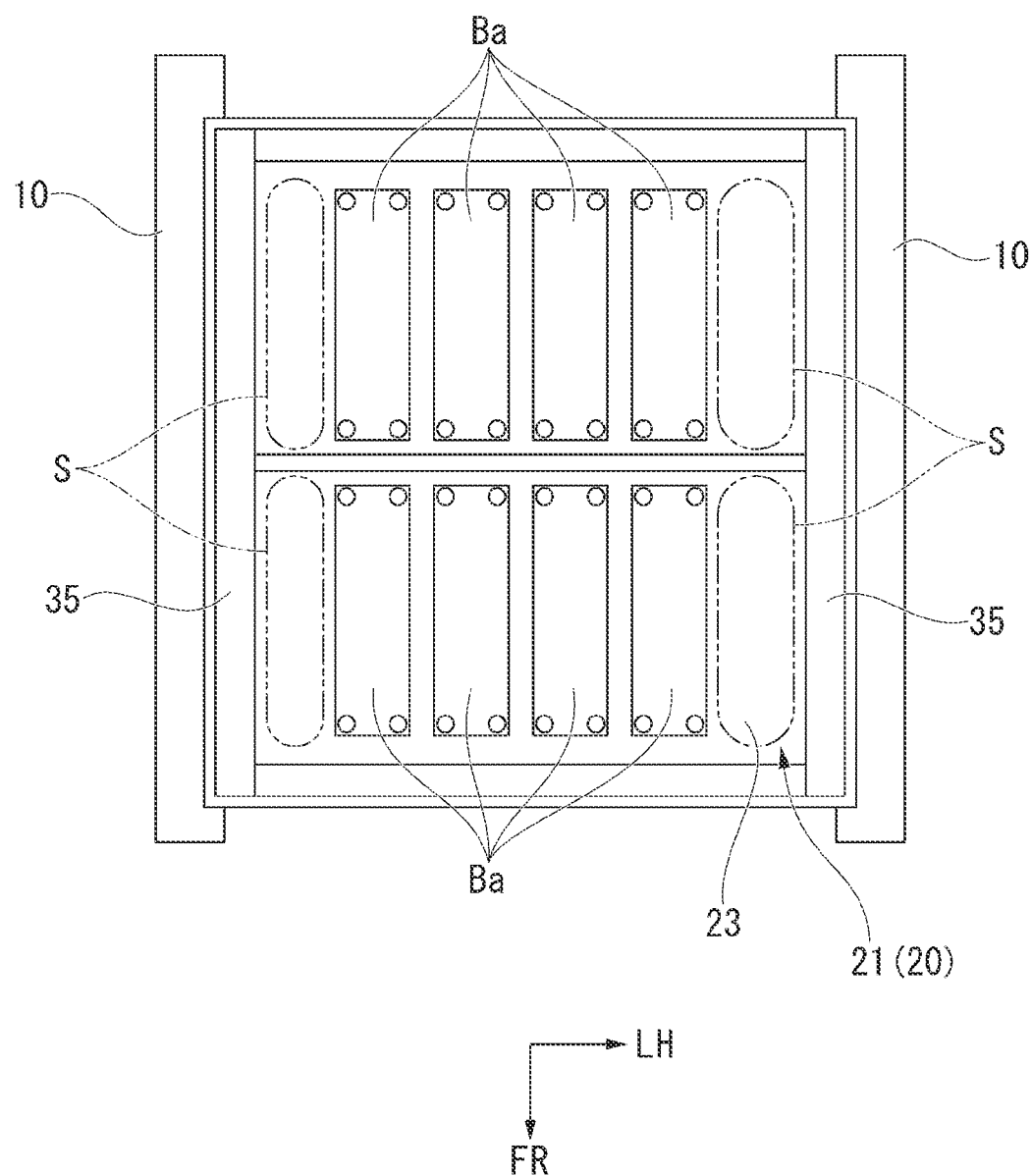
FIG. 11 is a schematic plan view showing the disposition of batteries in the vehicle of the embodiment.

FIG. 11 is an imaged view illustrating a state in which the battery case 20 having a plurality of batteries Ba installed therein is supported by the left and right side sills 10 via the case-mounting frames 35.

In the present embodiment, as illustrated in FIG. 11, a plurality of batteries Ba each having a rectangular parallelepiped shape are disposed side by side in the vehicle forward-rearward direction and the vehicle width direction (two stages in the front and rear and four rows in the vehicle width direction) while having the longitudinal direction thereof extending in the vehicle forward-rearward direction. For this reason, a large deformation space S for the side edge portion of the battery case 20 can be easily secured by adjusting the number of arrays of the batteries Ba in the vehicle width direction without causing drastic reduction of battery capacities of the batteries Ba.

<Deformation Behavior when Impact Load is Input>

Figure 12:
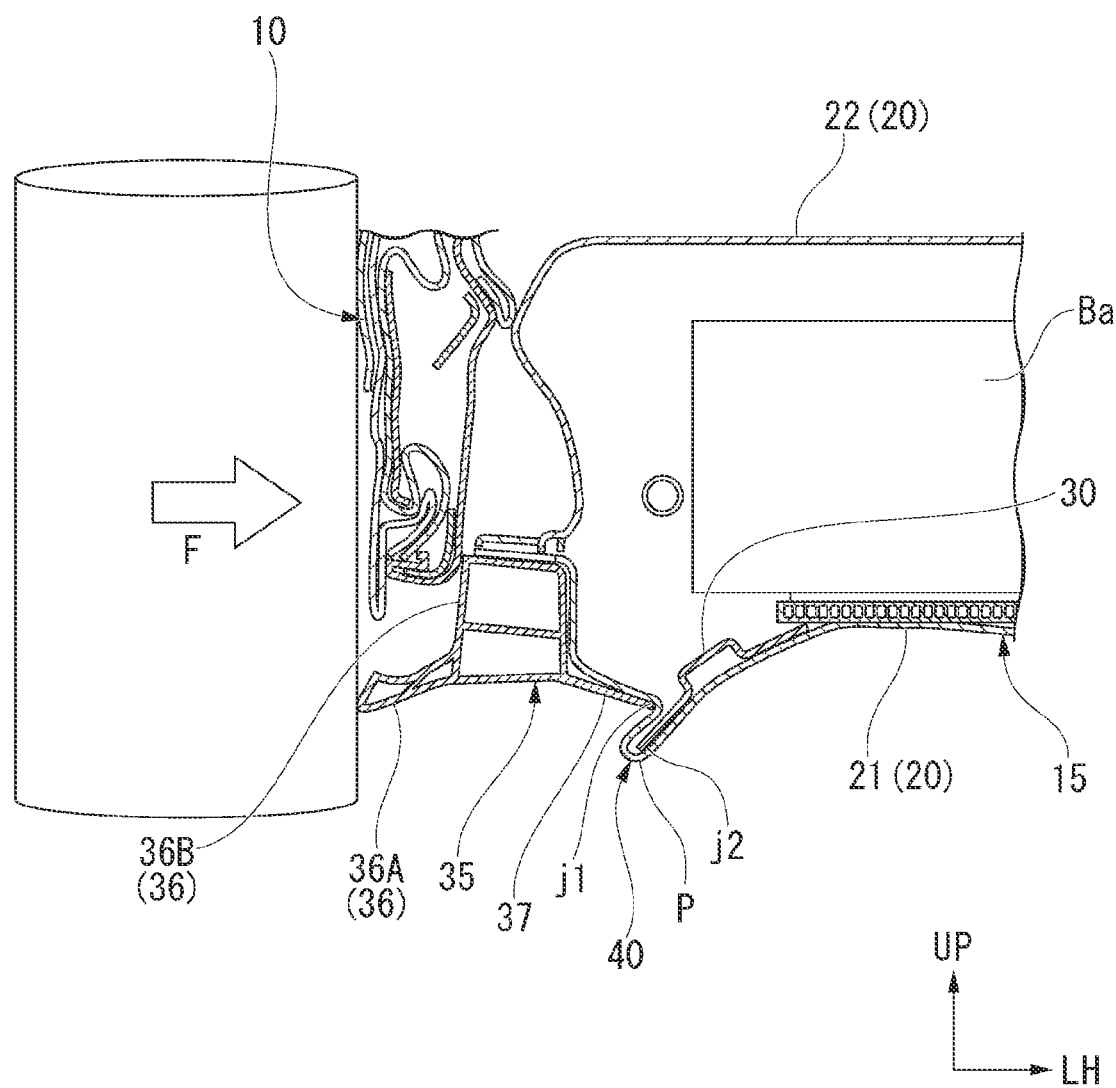
FIG. 12 is a cross-sectional view, which is similar to FIG. 3, illustrating the deformation behavior of the vehicle of the embodiment when an impact load is input.
Figure 13:
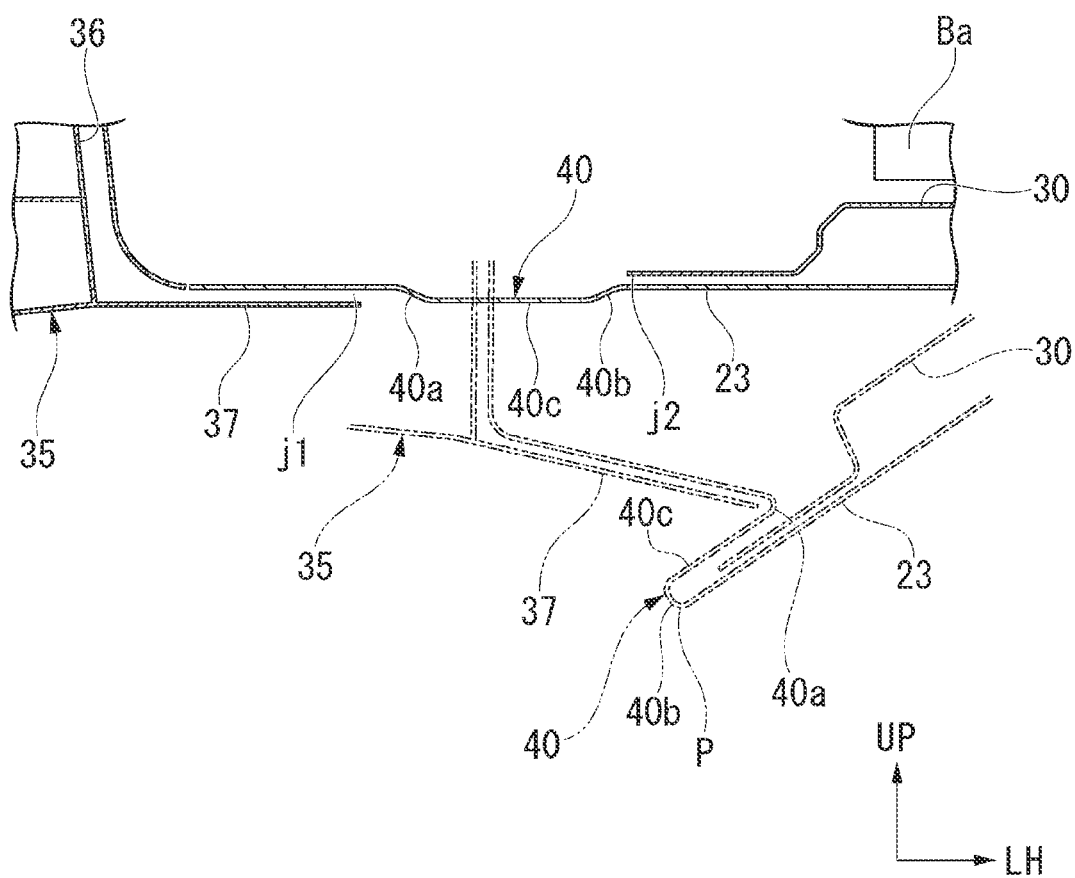
FIG. 13 is a schematic cross-sectional view of FIG. 10 collectively illustrating the deformation behavior of the vehicle of the embodiment when an impact load is input.

FIG. 12 is a cross-sectional view similar to FIG. 3 illustrating the deformation behavior of the vehicle Ve when an impact load is input, and FIG. 13 is a schematic cross-sectional view of FIG. 10 collectively illustrating the deformation behavior of the vehicle.

As indicated by the arrows in FIGS. 3 and 4, when an impact load F toward the inward side in the vehicle width direction is input to the side sill 10 from the outside, the case-mounting frame 35 is displaced to the inward side in the vehicle width direction together with the side sill 10 upon reception of the impact load F. At this time, a load acts from the battery case reception flange 37 of the case-mounting frame 35 toward the recessed portion 40 of the bottom wall 23 of the battery case 20.

Accordingly, a deformation fold p (refer to FIGS. 12 and 13) centering on the recessed portion 40 is generated at the side edge portion of the bottom wall 23 of the battery case 20 on the outward side, and the deformation fold p gradually grows downward. When growth of the deformation fold p proceeds, as illustrated in FIGS. 12 and 13, the joint portion j1 with respect to the battery case reception flange 37 and the joint portion j2 with respect to the battery support frame 30 in the bottom wall 23 are drawn into the deformation fold p and face the downward side (a side away from the batteries Ba). As a result, due to the deformation of the side edge portion of the bottom wall 23 of the battery case 20, the energy of the input impact load F is absorbed, and an impact on the batteries Ba by the battery case reception flange 37 is curbed.

<Effects of Embodiment>

As above, in the vehicle body lower structure of the present embodiment, the recessed portion 40 protruding downward is provided between the joint portion j1 with respect to the battery case reception flange 37 and the joint portion j2 with respect to the battery support frame 30 in the bottom wall 23 of the battery case 20. For this reason, when the impact load F toward the inward side in the vehicle width direction is input to the side sill 10, the deformation fold p centering on the recessed portion 40 grows to the downward side at the side edge portion of the bottom wall 23 of the battery case 20. At this time, the energy of an impact load is absorbed, and a distal end portion side of the battery case reception flange 37 faces a side below the batteries Ba. Therefore, when the vehicle body lower structure of the present embodiment is employed, damage to the batteries Ba by the battery case reception flange 37 can be prevented when an impact load is input, and the energy of the impact load can be efficiently absorbed.

In addition, the vehicle body lower structure of the present embodiment has a constitution in which the recessed portion 40 includes the outwardly inclined wall 40a which inclines downward to the inward side in the vehicle width direction from the joint portion j1 side with respect to the battery case reception flange 37, the inwardly inclined wall 40b which inclines downward to the outward side in the vehicle width direction from the joint portion j2 side with respect to the battery support frame 30, and the coupling wall 40c which couples the lower ends of both the inclined walls. For this reason, when an impact load toward the inward side in the vehicle width direction is input to the side sill 10, the distal end portion of the battery case reception flange 37 interferes with a proximal portion of the outwardly inclined wall 40a of the recessed portion 40, and the recessed portion 40 is easily deformed at each of the end portions of the outwardly inclined wall 40a, the coupling wall 40c, and the inwardly inclined wall 40b as bent points so that the deformation fold p can grow to the downward side. Therefore, when this constitution is employed, the distal end portion of the battery case reception flange 37 reliably faces the downward side, and thus an impact on the batteries Ba by the battery case reception flange 37 can be reliably avoided.

In addition, in the vehicle body lower structure of the present embodiment, the recessed portion 40 is formed to extend in a groove shape in the vehicle body forward-rearward direction in the bottom wall 23 of the battery case 20. For this reason, when an impact load toward the inward side in the vehicle width direction is input to the side sill 10, the deformation fold p is formed in a wide region at the side edge portion of the bottom wall 23 of the battery case 20 such that the distal end side of the battery case reception flange 37 faces downward. Therefore, when the vehicle body lower structure of the present embodiment is employed, an impact on the batteries Ba by the battery case reception flange 37 can be more reliably avoided.

Moreover, in the vehicle body lower structure of the present embodiment, a plurality of batteries Ba each having a rectangular parallelepiped shape are disposed side by side in the vehicle forward-rearward direction and the vehicle width direction in the battery case 20 while having the longitudinal direction thereof extending in the vehicle forward-rearward direction. For this reason, the deformation space S for the side edge portion of the battery case 20 can be easily secured by slightly adjusting the number of arrays of the batteries Ba in the vehicle width direction without causing drastic reduction of the battery capacities of the batteries Ba. Therefore, when this constitution is employed, reduction of the battery capacities of the batteries Ba can be curbed and an increase in the amount of energy absorption when an impact load is input can be achieved.

In addition, in the vehicle body lower structure of the present embodiment, the case-mounting frames 35 each include the frame main body portion 36 which has a substantially L-shaped cross section having the horizontal portion 36A and the upright standing portion 36B, and the battery case reception flange 37 which extends to the inward side in the vehicle width direction from the lower end of the frame main body portion 36. The plurality of hollow cells C1, C2, C3, and C4 are provided in the frame main body portion 36. For this reason, the case-mounting frame 35 can be fixed to the lower portion of the side sill 10 with high rigidity by joining the horizontal portion 36A of the frame main body portion 36 to the lower surface of the side sill 10. In addition, the plurality of hollow cells C1, C2, and C3 are provided in the frame main body portion 36. Therefore, the rigidity of the frame main body portion 36 itself can be enhanced by the plurality of hollow cells C1, C2, and C3. Moreover, since the plurality of hollow cells C1, C2, and C3 are provided in the frame main body portion 36, when an impact load is input to the side sill 10, the plurality of hollow cells C1, C2, and C3 are crushed and deformed so that the energy of the impact load can be efficiently absorbed during sufficient strokes.

In addition, in the vehicle body lower structure of the present embodiment, the height of the end edge on the outward side in the vehicle width direction gradually decreases toward the terminal portion, and the terminal portion is joined to the upper surface of the side sill 10 in the floor cross members 13 and 14 positioned above the battery case 20. Further, the inclined member 18 obliquely coupling the lower surface of the floor panel 11 and the inward side surface of the side sill 10 to each other is provided at a position below the end edge of each of the floor cross members 13 and 14 on the lower surface of the floor panel 11. For this reason, in the case of this constitution, in spite of having a shape in which the height of the side edge portion of each of the floor cross members 13 and 14 gradually decreases toward the outward side in the vehicle width direction, an occupant load input to each of the floor cross members 13 and 14 can be supported with high rigidity.

In addition, when an impact load is input to the side sill 10 from a lateral side, the inward side surface of the side sill 10 can be supported by a closed cross-sectional structure portion of each of the floor cross members 13 and 14 and the floor panel 11 via the inclined member 18. For this reason, the side sill 10 can be sufficiently crushed and deformed at a part on the outward side of the battery case 20 in the vehicle width direction so that the energy of an impact load can be efficiently absorbed. Therefore, when the vehicle body lower structure of the present embodiment is employed, damage to the batteries Ba inside the battery case 20 can be better curbed.

Moreover, in the vehicle body lower structure of the present embodiment, the case-mounting frame 35 is an extruded aluminum member. Therefore, the case-mounting frame 35 can be easily formed. That is, when the case-mounting frame 35 is manufactured, the case-mounting frame 35 can be formed by simply cutting a long material which has been shaped through aluminum extrusion and has a predetermined cross section into a suitable length. In addition, the case-mounting frames 35 having a common cross section can be used in many vehicles which differ in size of the battery case 20 by changing a cutting length of the long material having a predetermined cross section. Therefore, when this constitution is employed, productivity of the case-mounting frame 35 can be enhanced.

In addition, in the vehicle body lower structure of the present embodiment, the case main body 21 (the bottom wall 23, the side wall 24, and the joint flange 25) of the battery case 20 is constituted of an integrally pressed article. Therefore, an outer shell portion of the case main body 21 and the groove-shaped recessed portions 40 can be easily formed through press forming.

In addition, in the vehicle body lower structure of the present embodiment, the batteries Ba are constituted of a plurality of battery cells stacked in the longitudinal direction. The plurality of batteries Ba each having a rectangular parallelepiped shape are disposed side by side in the vehicle width direction in the battery case 20 while having the longitudinal direction thereof extending in the vehicle forward-rearward direction. Further, the battery accessories 33 are disposed in the upper portion at the center in the vehicle width direction of the plurality of batteries Ba arranged in the vehicle width direction. For this reason, the dimensions of the batteries Ba in their entirety in the vehicle width direction can be shortened without reducing the battery capacities of the batteries Ba in their entirety. Therefore, a larger space for absorbing the energy of an impact load can be secured on the outward side of the batteries Ba in the vehicle width direction by an amount corresponding to the dimensions of the batteries Ba in their entirety in the vehicle width direction which can be reduced.

In addition, in the vehicle body lower structure of the present embodiment, the electric wirings connected to the batteries Ba are disposed at the boundary portion b between the front and rear batteries Ba which are arranged in the vehicle forward-rearward direction inside the battery case 20, and the floor cross members 13 and 14 installed on the floor panel 11 above the battery case 20 are disposed at the front and rear positions with the boundary portion b sandwiched therebetween. For this reason, when an impact load is input from a lateral side of the vehicle, the electric wirings can be protected by the front and rear floor cross members 13 and 14. Therefore, when the constitution of the present embodiment is employed, damage to the electric wirings can be curbed, and a larger space for absorbing the energy of an impact load can be secured on the outward side of the batteries in the vehicle width direction.

The present invention is not limited to the foregoing embodiment, and various design changes can be made within a range not departing from the gist thereof.

What is claimed is:

1. A vehicle body lower structure, comprising:
    a battery case that is disposed below a floor panel of a vehicle body and accommodates a battery;
    a side sill that is disposed below a side portion of the vehicle body in a vehicle body forward-rearward direction; and
    a case-mounting frame that couples the side sill and the battery case to each other and causes the battery case to be supported by the side sill,
    wherein the case-mounting frame has
        a frame main body portion which is disposed on an outward side of the battery case in a vehicle width direction, and
        a battery case reception flange which extends to an inward side in the vehicle width direction from the frame main body portion and is joined to a lower surface of a bottom wall of the battery case,
    wherein a battery support frame extending in the vehicle body forward-rearward direction and supporting the battery is joined to an upper surface of the bottom wall of the battery case,
    wherein a recessed portion protruding downward is provided between a joint portion with respect to the battery case reception flange and a joint portion with respect to the battery support frame in the bottom wall of the battery case, and
    wherein the recessed portion is located at a further outer position in the vehicle width direction than an outer end of the battery in the vehicle width direction.

2. The vehicle body lower structure according to claim 1, wherein the recessed portion has
    an outwardly inclined wall which inclines downward toward the inward side in the vehicle width direction from a side of the joint portion with respect to the battery case reception flange,
    an inwardly inclined wall which inclines downward toward the outward side in the vehicle width direction from a side of the joint portion with respect to the battery support frame, and
    a coupling wall which couples lower ends of the outwardly inclined wall and the inwardly inclined wall to each other in a substantially horizontal manner.

3. The vehicle body lower structure according to claim 1, wherein the recessed portion extends in a groove shape in the vehicle body forward-rearward direction in the bottom wall of the battery case.

4. The vehicle body lower structure according to claim 1, wherein a plurality of batteries each having a rectangular parallelepiped shape are disposed side by side in a vehicle forward-rearward direction and the vehicle width direction in the battery case while having a longitudinal direction thereof extending in the vehicle forward-rearward direction.

5. The vehicle body lower structure according to claim 1, wherein the case-mounting frame includes
the frame main body portion which has a substantially L-shaped cross section having a horizontal portion joined to a lower surface of the side sill and an upright standing portion standing upright from the inward side of the horizontal portion in the vehicle width direction, and
the battery case reception flange which extends to the inward side in the vehicle width direction from a lower end of the frame main body portion, and
wherein a plurality of hollow cells partitioned by a partition wall are provided in the frame main body portion.

6. The vehicle body lower structure according to claim 1, wherein a floor cross member extending substantially in the vehicle width direction is joined to an upper surface of the floor panel positioned above the battery case,
wherein in the floor cross member, a height of an end edge on the outward side in the vehicle width direction gradually decreases toward a terminal portion, and the terminal portion is joined to an upper surface of the side sill, and
wherein an inclined member obliquely coupling a lower surface of the floor panel to an inward side surface of the side sill facing the inward side in the vehicle width direction is disposed at a position below the end edge of the floor cross member on the lower surface of the floor panel.

7. The vehicle body lower structure according to claim 1, wherein the case-mounting frame is an extruded aluminum member.

8. The vehicle body lower structure according to claim 3, wherein at least the bottom wall of the battery case and a peripheral wall surrounding the bottom wall are constituted of an integrally pressed article.

9. The vehicle body lower structure according to claim 1, wherein the battery is constituted of a plurality of battery cells stacked in a longitudinal direction,
wherein a plurality of batteries are disposed side by side in the vehicle width direction in the battery case while having a longitudinal direction thereof extending in a vehicle forward-rearward direction, and
wherein a battery accessory is disposed in an upper portion of the plurality of batteries arranged in the vehicle width direction at a center in the vehicle width direction.

10. The vehicle body lower structure according to claim 1,
wherein a plurality of batteries each having a rectangular parallelepiped shape are disposed side by side in a vehicle forward-rearward direction and the vehicle width direction in the battery case while having a longitudinal direction thereof extending in the vehicle forward-rearward direction,
wherein an electric wiring connected to the battery is disposed at a boundary portion between the front and rear batteries which are arranged in the vehicle forward-rearward direction,
wherein a plurality of floor cross members extending in the vehicle width direction are joined to an upper surface of the floor panel, and
wherein at least one of the floor cross members is disposed at each of front and rear positions in the vehicle with the boundary portion sandwiched therebetween.

11. The vehicle body lower structure according to claim 1, wherein an outer end of the battery support frame is located at a further outer position in the vehicle width direction than the battery.

12. The vehicle body lower structure according to claim 1,
wherein the recessed portion is formed at both sides in the vehicle width direction, and the bottom wall of the battery case between the recessed portions is flat.

* * * * *